(12) United States Patent
Brannstrom et al.

(10) Patent No.: US 10,059,315 B2
(45) Date of Patent: Aug. 28, 2018

(54) VEHICLE BRAKE-CONTROL-SYSTEM, VEHICLE COMPRISING A BRAKE-CONTROL-SYSTEM AND A METHOD FOR CONTROLLING A VEHICLE BRAKE SYSTEM

(71) Applicant: VOLVO CAR CORPORATION, Gothenburg (SE)

(72) Inventors: Mattias Erik Brannstrom, Gothenburg (SE); Jonas Nilsson, Molndal (SE); Mohammad Ali, Angered (SE)

(73) Assignee: VOLVO CAR CORPORATION (SE)

( * ) Notice: Subject to any disclaimer, the term of this patent is extended or adjusted under 35 U.S.C. 154(b) by 45 days.

(21) Appl. No.: 15/283,486

(22) Filed: Oct. 3, 2016

(65) Prior Publication Data

US 2017/0101080 A1   Apr. 13, 2017

(30) Foreign Application Priority Data

Oct. 7, 2015   (EP) ..................... 15188744

(51) Int. Cl.
*B60T 7/12*     (2006.01)
*B60W 50/08*    (2012.01)
*B60T 8/24*     (2006.01)

(52) U.S. Cl.
CPC ................ *B60T 7/12* (2013.01); *B60T 8/246* (2013.01); *B60W 50/08* (2013.01)

(58) Field of Classification Search
CPC ............ B60T 7/12; B60T 8/246; B60W 50/08
See application file for complete search history.

(56) References Cited

U.S. PATENT DOCUMENTS

2014/0303827 A1* 10/2014 Dolgov ................. B60W 30/00
                                                            701/23
2016/0207538 A1*  7/2016 Urano ................. B60W 30/182

FOREIGN PATENT DOCUMENTS

EP    2848488 A1    3/2015
EP    2921363 A1    9/2015

OTHER PUBLICATIONS

Extended European Search Report dated Mar. 18, 2016, Application No. 15188744.5-1756, Applicant Volvo Car Corporation, 5 Pages.

* cited by examiner

*Primary Examiner* — Mussa A Shaawat
*Assistant Examiner* — Michael V Kerrigan
(74) *Attorney, Agent, or Firm* — Brooks Kushman P.C.

(57) ABSTRACT

A vehicle, a method and a vehicle brake-control-system are provided. The host vehicle comprises a steering wheel, a vehicle brake system, at least one sensor arranged to monitor a sensor monitoring area of a host vehicle surrounding and an autonomous operating arrangement which is arranged to control steering and velocity of the host vehicle in an autonomous operating mode at least partly based on information received from the at least one sensor. The vehicle brake-control-system is arranged to determine if the steering wheel is manually operated when the vehicle is operating in the autonomous driving mode, and if so control the vehicle brake system to perform braking of the host vehicle.

18 Claims, 1 Drawing Sheet

VEHICLE BRAKE-CONTROL-SYSTEM, VEHICLE COMPRISING A BRAKE-CONTROL-SYSTEM AND A METHOD FOR CONTROLLING A VEHICLE BRAKE SYSTEM

CROSS-REFERENCE TO RELATED APPLICATIONS

This application claims foreign priority benefits under 35 U.S.C. § 119(a)-(d) to European patent application number EP 15188744.5, filed Oct. 7, 2015, which is incorporated by reference in its entirety.

TECHNICAL FIELD

Embodiments herein relate to a vehicle brake-control-system. Embodiments herein further relate to a vehicle comprising a vehicle brake-control-system and to a method for controlling a vehicle brake system.

BACKGROUND

Some vehicles today have different driving modes with different levels of activated arrangements and systems for relieving a vehicle operator from some or all operations he/she otherwise would have had to perform in order to drive the vehicle along a route.

A driving mode in which the vehicle operator himself/herself drives the vehicle along a route or road is referred to as a manual driving mode. In the manual driving mode the vehicle operator provides e.g., steering-, accelerating- and braking input to the vehicle.

Some vehicles are capable of driving autonomously, i.e., without steering- accelerating- or braking input from a vehicle operator. Sensors of the autonomous vehicle continuously monitor the vehicle surrounding. The sensors can detect e.g., road lanes, surrounding traffic and various obstacles on- or in the vicinity of the road. The sensors may detect distances and directions to other vehicles, pedestrians, bicycles, etc. Different kinds of sensors may be used, such as cameras, radar and/or lidar. Autonomous vehicles can also comprise communication equipment, such that road and/or traffic information may be sent to/from the vehicle. A drive arrangement or operating arrangement of the vehicle can then control drive functions, such as steering, accelerating, braking etc., as a function of the information received from the sensors and information sent to the vehicle. Hereby the vehicle can drive autonomously along at least some road sections within a road network. A driving mode in which the vehicle is driving autonomously is referred to as an autonomous driving mode.

Autonomous drive functions may facilitate for a vehicle operator, since he/she may focus on secondary tasks instead of driving when autonomous driving is enabled. However, vehicle operators may be unaccustomed with autonomous drive functions and may therefore possibly start to operate the vehicle manually in situations where a transition from autonomous driving to manual driving is not suitable. Further a vehicle operator may, for example due to old habits, start to operate the vehicle manually in situations where autonomous driving functions well or even is preferable, e.g., from a safety and/or comfort point of view. This may also cause confusion on whether the responsibility for operating the vehicle lies with on the autonomous drive system or the vehicle operator.

Thus, improvements related to uncalled vehicle operator interaction and transitions between different driving modes are desirable.

SUMMARY

Embodiments herein aim to provide a vehicle brake-control-system eliminating or at least reducing the problems and/or drawbacks associated with prior art solutions.

According to an embodiment, this is provided by a vehicle brake-control-system for control of a vehicle brake system of a host vehicle comprising; a steering wheel, a vehicle brake system, at least one sensor arranged to monitor a sensor monitoring area of a host vehicle surrounding and an autonomous operating arrangement which is arranged to control steering and velocity of the host vehicle in an autonomous operating mode at least partly based on information received from the at least one sensor, wherein the vehicle brake-control-system is arranged to; determine if the steering wheel is manually operated when the vehicle is operating in the autonomous driving mode, and if so control the vehicle brake system to perform braking of the host vehicle. In some embodiments the vehicle brake-control system comprises a sensor which is arranged to detect steering wheel rotation and/or an applied steering wheel torque.

Since the vehicle brake-control-system is arranged to determine if the steering wheel is manually operated when the vehicle is operating in the autonomous driving mode, and if so, arranged to control the vehicle brake system to perform braking of the host vehicle, a vehicle operator is discouraged from interacting with the steering wheel when the vehicle is driven autonomously. If the vehicle operator stops turning the steering wheel the braking is aborted and the vehicle can continue to be driven in the autonomous driving mode.

Situations may occur where a vehicle operator, e.g., due to old habits or lack of experience, start to turn the steering wheel when the host vehicle is driven autonomously in a situation where manual operation of the steering wheel is unnecessary or not preferable. For example, the vehicle operator can start to turn the steering wheel in a situation where the autonomous driving mode is advantageous, e.g., for safety and/or comfort reasons.

Braking of the host vehicle has proven to be efficient for teaching unexperienced vehicle operators to avoid unnecessary manual operation of the steering wheel during autonomous driving. Hereby less manual turning of the steering wheel is achieved, which in turn allows the autonomous operating arrangement to control the host vehicle in an intended and foreseeable manner. In addition, the braking of the vehicle also makes it clearer for the driver that the vehicle is driven autonomously. This will decrease a risk for further manual driving attempts when the vehicle is driven autonomously.

According to some embodiments the vehicle brake-control-system comprises a steering wheel sensor, arranged to determine if a steering column of the steering wheel is rotated due to manual operation of the steering wheel and further arranged to control the vehicle brake system to perform braking of the host vehicle upon such determination. A steering wheel sensor is reliable and cost-efficient for determining if the steering wheel is manually turned. The steering wheel sensor can be e.g., a sensor which detects a momentum caused by manual turning of the steering wheel.

According to some embodiments the vehicle brake-control-system is arranged to determine, based on determined steering column rotation or input received from a host vehicle steering system, the magnitude of steering wheel torque due to manual operation and further arranged to control the vehicle brake system to perform braking of the host vehicle in dependence of the magnitude of the manual steering wheel torque. Hereby a vehicle operator can receive feedback in a more efficient and pedagogic manner when he/she turns the steering wheel during autonomous driving.

According to some embodiments the vehicle brake-control-system further comprises an alert arrangement which is arranged to generate at least one of; a visual alert, an audio alert, a haptic alert, in a host vehicle passenger compartment if manual operation of the steering wheel during autonomous driving is determined. Such an alert further enhances discouragement of manual steering interaction during autonomous driving.

According to some embodiments the alert is arranged to be generated if manual operation of the steering wheel for at least a predetermined time duration is determined. Such a predetermined time duration can be e.g., 3-5 seconds.

According to some embodiments the alert is arranged to be generated when a velocity of the host vehicle has been decreased with a predetermined velocity due to the braking. For example, the alert can be generated when the host vehicle has been decelerated with 15, 20 or 25 km/h due to the braking.

Thus, hereby is provided a vehicle brake-control-system, eliminating or at least reducing the problems and/or drawbacks associated with prior art solutions.

Embodiments herein also aim to provide a vehicle comprising a vehicle brake-control-system without the problems or drawbacks described above.

According to some embodiments, this is provided by a vehicle comprising a vehicle brake-control-system according to embodiments disclosed herein.

Embodiments herein also aim to provide a method for controlling a vehicle brake system without the problems or drawbacks described above.

According to some embodiments, this is provided by a method for controlling a vehicle brake system of a host vehicle comprising a steering wheel, a vehicle brake system, at least one sensor arranged to monitor a sensor monitoring area of a host vehicle surrounding and an autonomous operating arrangement which is arranged to control steering and velocity of the host vehicle in an autonomous operating mode at least partly based on information received from the at least one sensor, wherein the method comprises;

determining, by a vehicle brake-control-system, if the steering wheel is manually operated when the vehicle is operating in the autonomous operating mode, and if so controlling, by the vehicle brake-control-system, the vehicle brake system to perform braking of the host vehicle.

BRIEF DESCRIPTION OF THE DRAWINGS

The various aspects of embodiments herein, including its particular features and advantages, will be readily understood from the following detailed description and the accompanying drawings, in which.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings. Like numbers refer to like elements throughout. Well-known functions or constructions will not necessarily be described in detail for brevity and/or clarity.

Figure 1:
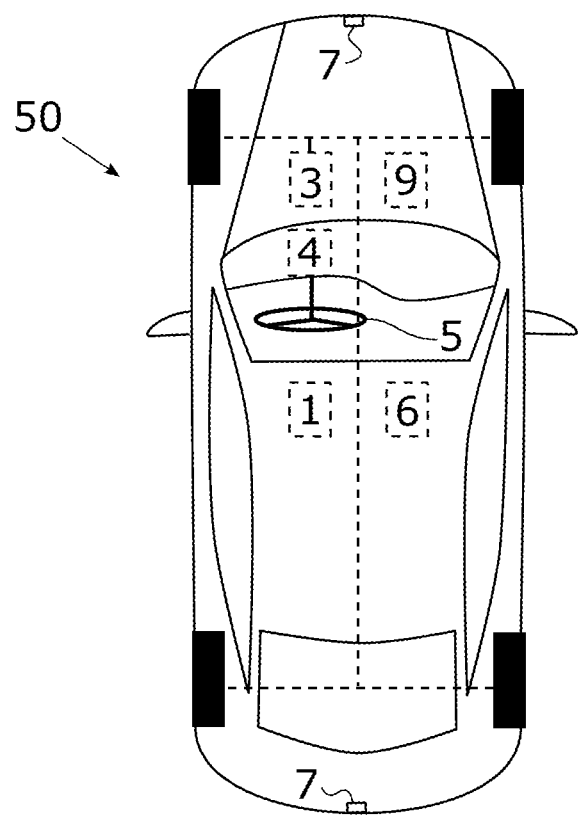
FIG. 1 illustrates a vehicle and a vehicle brake-control-system according to some embodiments.

FIG. 1 illustrates a host vehicle 50 comprising a vehicle brake-control-system 1 for control of a host vehicle brake system 3. The host vehicle 50 may be a car, a truck, a bus or any other type of road vehicle.

The vehicle brake system 3 can comprise disc brakes, where calipers are configured to squeeze brake pads against a brake disc. The vehicle brake system 3 can also comprise drum brakes or any other type of brakes which can be used for braking the host vehicle 50.

The host vehicle 50 comprises a steering wheel 5 which is part of a host vehicle steering system. A steering column or steering shaft transfers a rotation of the steering wheel e.g., to a pinion and rack which in turn can transfer the movement to a tie rod, steering knuckle or similar. In some embodiments the steering system comprises a power steering gearbox, power steering, power assisted steering (PAS), electric power assisted steering (EPS/EPAS) or similar.

The host vehicle 50 and/or the safety system 1 comprise one or more sensors 7. The sensor or sensors 7 are arranged to monitor a sensor coverage area of a host vehicle surrounding.

The sensor or sensors 7 can be one or more camera sensors, one or more radar sensors, one or more lidar-sensors or any combination thereof. The at least one sensor 7 can be arranged at any position in/on the host vehicle 50 from where detection of a vehicle surrounding is possible. Sensors 7 may for example be arranged at a vehicle front-, side and/or rear portion, at a vehicle grille, bumpers, rear-view-mirrors and/or a windshield. Some sensors 7 may be arranged in or near a vehicle compartment, chassis, motor, drivetrain and/or wheels. A sensor position may depend on the type of sensor used. For example, a camera sensor may be arranged at an inside of a windshield, while one or more radar sensors and/or one or more lidar sensors may be arranged in the grille and/or bumpers.

A camera sensor may be e.g., a front-, side- or rear facing digital camera equipped with or connected to one or more processors with object recognition logics. Hereby surrounding objects, such as road lanes, lane markers, other vehicles, traffic signs, pedestrians, animals, different obstacles etc., may be detected and in some cases identified/classified. Radar sensors include transmitters that emit signals that bounce back from objects around the host vehicle 50, and receivers that receive the returned signals. The radar sensors may include e.g., ultra-wide band radars, narrow band radars and/or multi node radars. Lidar-sensors measure distances to objects through illuminating the objects with lasers and analyzing the reflected light. Other types of sensors 7 used to monitor the vehicle surrounding may be e.g., ultrasonic sensors and/or infrared sensors.

The host vehicle 50 comprises an autonomous operating arrangement 9 which allows the host vehicle 50 to be driven autonomously along a route or a road. The autonomous operating arrangement 9 can comprise an electrical/mechanical control arrangement, arranged to control steering and velocity of the host vehicle 50 at least partly based on information received from the sensors 7. The autonomous operating arrangement 9 is connected to the vehicle steering system, such that the autonomous operating arrangement, directly or indirectly, can control a direction of at least some of the wheels of the host vehicle 50. Hereby e.g., a yaw rate of the host vehicle 50 can be adjusted, such that the driving direction of the host vehicle 50 is adjusted in accordance with the input from the autonomous operating arrangement 9. The autonomous operating arrangement 9 is also connected to a host vehicle propulsion arrangement, such as an internal combustion engine or electrical motor and a host vehicle braking system, such that the autonomous operating arrangement 9, directly or indirectly, can control acceleration and/or deceleration of the host vehicle 50. The autonomous operating arrangement 9 can e.g., increase a host vehicle velocity by increasing the engine/motor speed, and decrease the host vehicle velocity by engine/motor-braking or by activation of one or more wheel brakes. The autonomous operating arrangement 9 may e.g., be connected to an ABS (anti-lock braking system), such that one or more wheel brakes can be activated selectively.

The vehicle brake-control-system 1 is arranged to determine if the steering wheel is manually operated when the vehicle is operating in the autonomous driving mode. A steering wheel sensor 4 can be used for the determination. The steering wheel sensor 4 can be comprised in the brake-control system 1. In some embodiments the vehicle brake-control-system 1 is connected to an existing steering wheel sensor 4. The steering wheel sensor 4 can detect movements and/or momentum caused by manual turning of the steering wheel 5. The steering wheel sensor 4 can for example be arranged at the steering column, at a pinion and rack, a tie rod, a steering knuckle or at any position from where it can detect rotation of the steering wheel 5 and/or an applied steering wheel torque. The steering wheel sensor 4 can e.g., be arranged to detect an angular deformation of a steering torsion bar. Together with information on a steering column stiffness, the amount of manual torque applied to the steering wheel 5 can be determined. In some embodiments other types of sensors can be used for determination on the amount of manual torque applied to the steering wheel 5.

The steering wheel sensor 4 can be e.g., a steering wheel angle sensor and/or a steering wheel torque sensor. In some embodiments the steering wheel sensor 4 is arranged as a camera sensor. Such a camera sensor can monitor the steering wheel 5 and can determine steering wheel rotation e.g., based on analysis of captured images.

If the steering wheel 5 is manually operated when the vehicle 50 is operating in the autonomous driving mode, the vehicle brake-control-system 1 is arranged to control the vehicle brake system 3 to perform braking of the host vehicle 50. In some embodiments the vehicle brake-control-system 1 is arranged to control the host vehicle 50 to be engine/motor-braked.

Optionally the vehicle brake-control-system 1 also comprises an alert arrangement 6 which is arranged to generate at least one of a visual alert, an audio alert, and a haptic alert, in a host vehicle passenger compartment if manual operation of the steering wheel during autonomous driving is determined. In some embodiments an alert is generated when the steering wheel has been manually operated for a predetermined amount of time. In some embodiments an alert is generated when a velocity of the host vehicle has been decreased with a predetermined velocity due to the braking. For example, an alert can be generated when the host vehicle has been decelerated 20 km/h compared with a host vehicle velocity before the braking operation. In some embodiments host vehicle hazard lights are activated if manual operation of the steering wheel during autonomous driving is determined.

Figure 2:
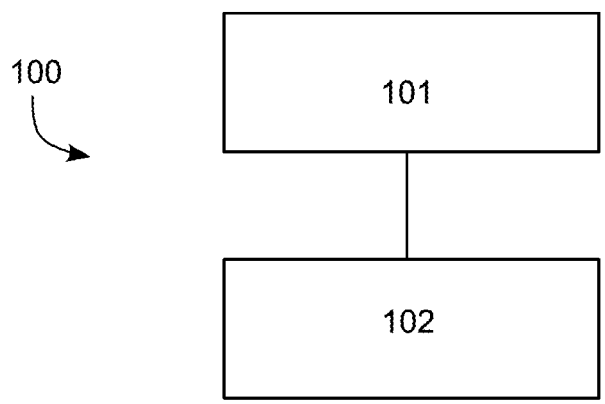
FIG. 2 illustrates a method for controlling a vehicle brake system.

In FIG. 2 is illustrated a method 100 for controlling a vehicle brake system of a host vehicle comprising a steering wheel, a vehicle brake system, at least one sensor arranged to monitor a sensor monitoring area of a host vehicle surrounding and an autonomous operating arrangement which is arranged to control steering and velocity of the host vehicle in an autonomous operating mode at least partly based on information received from the at least one sensor. The method 100 comprises; determining 101, by a vehicle brake-control-system, if the steering wheel is manually operated when the vehicle is operating in the autonomous operating mode, and if so, controlling 102, by the vehicle brake-control-system, the vehicle brake system to perform braking of the host vehicle.

As one skilled in the art would understand, any of the above described systems and arrangements (e.g., vehicle brake-control-system 1, vehicle brake system 3, steering system, alert arrangement 6, autonomous operating arrangement 9, etc.) may include suitable hardware and/or software, such as one or more processors (e.g., one or more microprocessors, microcontrollers and/or programmable digital signal processors) in communication with, or configured to communicate with, one or more storage devices or media including computer readable program instructions that are executable by the one or more processors so that the system or arrangement may perform particular algorithms represented by the functions and/or operations described herein. Any of the above described systems and arrangements may also, or instead, include one or more application specific integrated circuits, programmable gate arrays or programmable array logic, programmable logic devices, or digital signal processors.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A vehicle brake-control-system for control of a vehicle brake system of a host vehicle that further includes a steering wheel, at least one sensor arranged to monitor a sensor monitoring area of a host vehicle surrounding, and an autonomous operating arrangement which is arranged to control steering and velocity of the host vehicle in an autonomous operating mode at least partly based on information received from the at least one sensor, wherein the vehicle brake-control-system is operable to:
   determine if the steering wheel is manually operated when the vehicle is operating in the autonomous operating mode; and, if so,
   control the vehicle brake system to perform braking of the host vehicle.

2. The vehicle brake-control-system according to claim 1 further comprising a steering wheel sensor configured to determine if a steering column of the steering wheel is rotated due to manual operation of the steering wheel, wherein the vehicle brake-control-system is further operable to control the vehicle brake system to perform braking of the host vehicle upon such determination.

3. The vehicle brake-control-system according to claim 1 wherein the vehicle brake-control-system is operable to determine, based on determined steering column rotation or input received from a host vehicle steering system, magnitude of steering wheel torque due to manual operation and is further operable to control the vehicle brake system to perform braking of the host vehicle in dependence of the magnitude of the manual steering wheel torque.

4. The vehicle brake-control-system according to claim 1 further comprising an alert arrangement which is operable to generate at least one of a visual alert, an audio alert, or a haptic alert, in a host vehicle passenger compartment if manual operation of the steering wheel during autonomous driving is determined.

5. The vehicle brake-control-system according to claim 4 wherein the alert arrangement is operable to generate the at least one alert if manual operation of the steering wheel for at least a predetermined time duration is determined.

6. The vehicle brake-control-system according to claim 4 wherein the alert arrangement is operable to generate the at least one alert when a velocity of the host vehicle has been decreased with a predetermined velocity due to the braking.

7. The vehicle brake-control-system according to claim 1 wherein, upon determining that the steering wheel is manually operated when the vehicle is operating in the autonomous operating mode, the vehicle brake-control-system is operable to control the vehicle brake system to initiate the braking of the host vehicle to discourage a vehicle operator from interacting with the steering wheel when the vehicle is driven autonomously.

8. The vehicle brake-control-system according to claim 1 wherein the vehicle brake-control-system is operable to control the vehicle brake system to perform the braking of the host vehicle to discourage a vehicle operator from interacting with the steering wheel when the vehicle is driven autonomously, and to abort the braking if the vehicle operator stops turning the steering wheel.

9. A vehicle comprising a vehicle brake-control-system according to claim 1.

10. A method for controlling a vehicle brake system of a host vehicle that further includes a steering wheel, at least one sensor arranged to monitor a sensor monitoring area of a host vehicle surrounding, and an autonomous operating arrangement which is arranged to control steering and velocity of the host vehicle in an autonomous operating mode at least partly based on information received from the at least one sensor, the method comprising:
determining, by a vehicle brake-control-system, if the steering wheel is manually operated when the vehicle is operating in the autonomous operating mode; and, if so,
controlling, by the vehicle brake-control-system, the vehicle brake system to perform braking of the host vehicle.

11. The method according to claim 10 further comprising determining, using a steering wheel sensor, if a steering column of the steering wheel is rotated due to manual operation of the steering wheel, and controlling the vehicle brake system to perform braking of the host vehicle upon such determination.

12. The method according to claim 10 further comprising determining, by the vehicle brake-control-system, magnitude of steering wheel torque due to manual operation of the steering wheel, and controlling the vehicle brake system to perform braking of the host vehicle in dependence of the magnitude of the manual steering wheel torque.

13. The method according to claim 10 further comprising generating, by an alert arrangement, at least one of a visual alert, an audio alert, or a haptic alert in a host vehicle passenger compartment if manual operation of the steering wheel during autonomous driving is determined.

14. The method according to claim 13 wherein generating the at least one alert comprises generating the at least one alert if manual operation of the steering wheel for at least a predetermined time duration is determined.

15. The method according to claim 13 wherein generating the at least one alert comprises generating the at least one alert when a velocity of the host vehicle has been decreased by a predetermined velocity due to the braking.

16. The method according to claim 10 wherein controlling the vehicle brake system is performed to initiate the braking upon determining that the steering wheel is manually operated when the vehicle is operating in the autonomous operating mode.

17. The method according to claim 10 wherein controlling the vehicle brake system is performed to discourage a vehicle operator from interacting with the steering wheel when the vehicle is driven autonomously, and the method further comprises aborting the braking if the vehicle operator stops turning the steering wheel.

18. A method for controlling a vehicle brake system of a host vehicle that further includes a steering wheel, at least one sensor arranged to monitor a sensor monitoring area of a host vehicle surrounding, and an autonomous operating arrangement which is configured to control steering and velocity of the host vehicle in an autonomous operating mode at least partly based on information received from the at least one sensor, the method comprising:
determining, by a vehicle brake-control-system, if the steering wheel is manually operated when the vehicle is operating in the autonomous operating mode; and, if so,
controlling, by the vehicle brake-control-system, the vehicle brake system to initiate braking of the host vehicle to discourage a vehicle operator from interacting with the steering wheel when the vehicle is driven autonomously.

* * * * *